United States Patent [19]

Matsuzaki et al.

[11] Patent Number: 4,703,345
[45] Date of Patent: Oct. 27, 1987

[54] CURRENT CONTROL APPARATUS IN WHICH THE BEAM CURRENT FOR ALL THREE COLORS IS CONTROLLED ACCORDING TO AVERAGE AND PEAK VALUES

[75] Inventors: Atsushi Matsuzaki; Mitsumasa Saito, both of Kanagawa, Japan

[73] Assignee: Sony Corporation, Tokyo, Japan

[21] Appl. No.: 683,802

[22] Filed: Dec. 19, 1984

[30] Foreign Application Priority Data

Dec. 20, 1983 [JP] Japan .................. 58-240076
Dec. 22, 1983 [JP] Japan .................. 58-242541

[51] Int. Cl.⁴ .................. H04N 9/16; H04N 9/31
[52] U.S. Cl. .................. 358/74; 358/60
[58] Field of Search .................. 358/74, 243, 60

[56] References Cited

U.S. PATENT DOCUMENTS 4,219,843 8/1980 Takahashi .................. 358/60
4,224,640 9/1980 Hovens et al. .................. 358/74
4,370,674 1/1983 Johnson et al. .................. 358/74

Primary Examiner—James J. Groody
Assistant Examiner—Robert M. Bauer
Attorney, Agent, or Firm—Hill, Van Santen, Steadman & Simpson

[57] ABSTRACT

A cathode ray tube beam current control apparatus for controlling the beam current in a plurality of cathode ray tubes each of which produce different colors wherein each of the cathode ray tubes have a current source circuit which is connected to a respective cathode of each of the cathode ray tubes and a current sink circuit which is connected to the cathode of each of the cathode ray tubes as well as a circuit for substracting the current of the current source circuit from the current of the current sink circuit and each cathode ray tube includes a control circuit which receives an input from the output of the circuit for subtracting and is connected to each of the cathode ray tubes so as to control their luminescence level.

6 Claims, 12 Drawing Figures

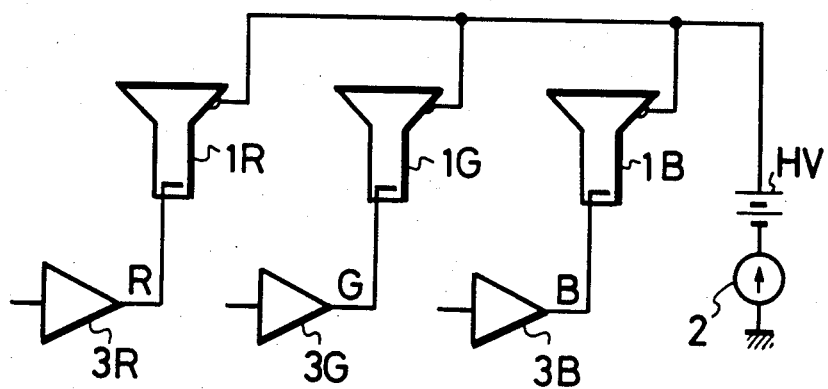

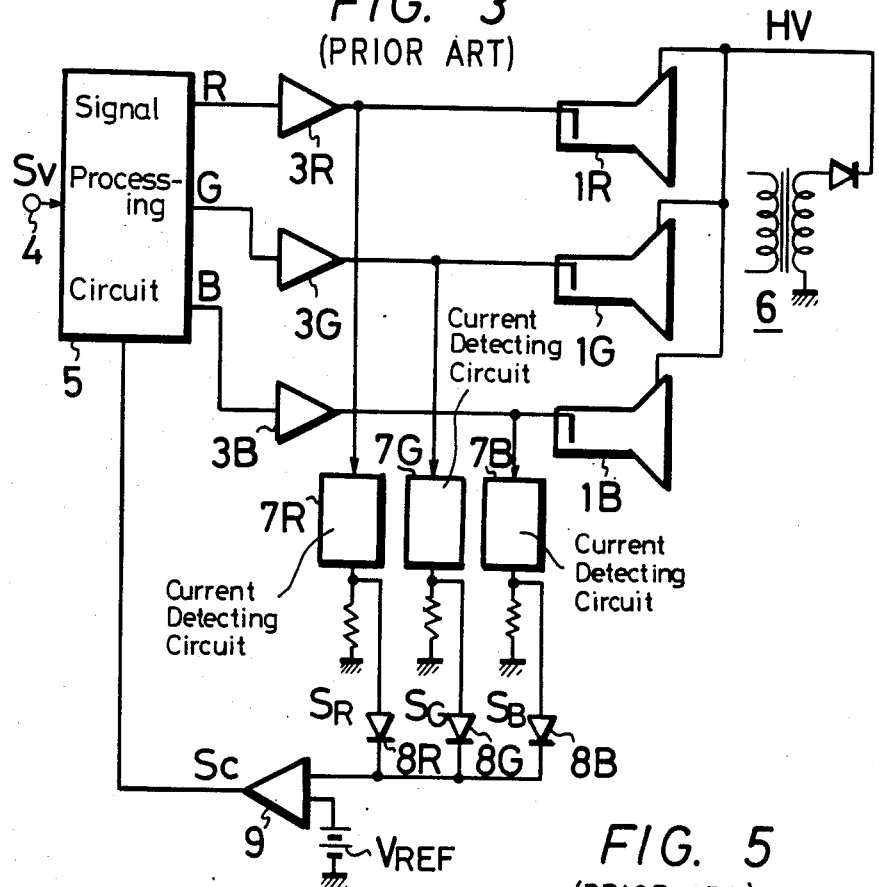
FIG. 3 (PRIOR ART)
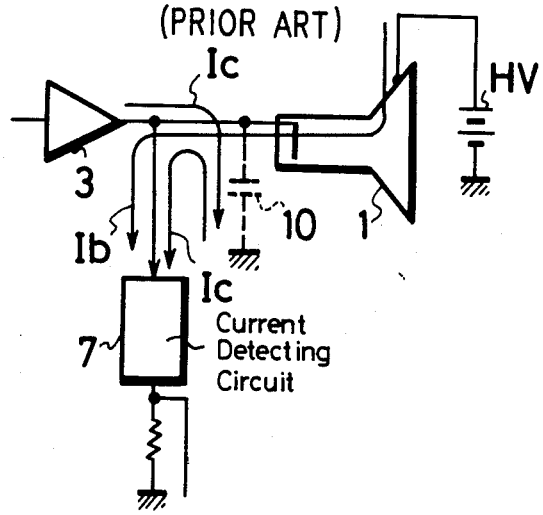
FIG. 5 (PRIOR ART)
FIG. 4 (PRIOR ART)
|       | (1R) | (1G) | (1B) |
|-------|------|------|------|
| White | 0.5  | 1    | 0.7  |
| Red   | 1    | 0    | 0    |
| Green | 0    | 1    | 0    |
| Blue  | 0    | 0    | 1    |

CURRENT CONTROL APPARATUS IN WHICH THE BEAM CURRENT FOR ALL THREE COLORS IS CONTROLLED ACCORDING TO AVERAGE AND PEAK VALUES

BACKGROUND OF THE INVENTION

1. Field of the Invention

This invention relates generally to television receivers and more particularly relates to a television receiver having a plurality of cathode ray tubes, in which the beam current is detected by detecting the cathode current of each cathode ray tube and the brightness of the luminance level is limited on the basis of the detected current.

2. Description of the Prior Art

In the prior art, there has been proposed an ABL (automatic brightness limiting) circuit for protecting a cathode ray tube from heat, for preventing X-rays from being emitted by excessive beam current and for preventing the high voltage generating circuit from being overloaded. That is, a beam current of the cathode ray tube is detected and the detected current is negatively fed back to a brightness adjusting circuit to thereby limit the beam current of the cathode ray tube. Such ABL circuit is similarly provided in a three-tube type video projector which includes cathode ray tubes of, for example, red, green and blue colors.

The ABL controls are classified as average value ABL control in which the ABL control is carried out on the basis of an average value of the beam current and peak value ABL control in which the ABL control is carried out on the basis of a peak value of the beam current.

In the afore-noted video projector of, for example, the three-tube type, the average value ABL control is carried out such that as shown in FIG. 1, the sum of the high voltage currents flowing through cathode ray tubes 1R, 1G and 1B for red, green and blue colors is detected with a detecting circuit 2 and the ABL control is carried out on the basis of such detected current. In FIG. 1, reference letter HV represents a high voltage and reference numerals 3R, 3G and 3B respectively designate drive circuits for the cathode ray tubes 1R, 1G and 1B.

In this case, however, it is difficult to assure that the cathode ray tube demonstrates excellent light emission. For example, let it be considered that an average current of only 1 mA flows in the respective cathode ray tubes 1R, 1G and 1B. In this case, if the brightness of luminance level, namely, the beam current is limited by the detection current, 1 mA, in the case of white, red, green and blue color picture screens, the average beam current flowing through the respective cathode ray tubes 1R, 1G and 1B is limited to the level as shown in the table of FIG. 2A. As a result, it is possible to avoid destroying the cathode ray tubes. However, in the case of the white color picture screen, each average beam current flowing through the respective cathode ray tubes 1R, 1G and 1B is considerably less than 1 mA so that the light emission capability of the respective cathode ray tubes 1R, 1G and 1B will not be obtained. On the other hand, if the luminance level, namely, the beam current is limited by, for example, a detection current 2.2 mA, in the case of white, red, green and blue color picture screens, the average beam current flowing through the respective cathode ray tubes 1R, 1G and 1B will be limited by the level as shown in the table of FIG. 2B so that the brightness in the case of a white picture screen becomes 2.2 times as high as the above case and hence the light emission capability of the cathode ray tube can be obtained. However, in this latter case, for the red, green and blue picture screens, the average current of up to 2.2 mA flows through the respective cathode ray tubes 1R, 1G and 1B, resulting in the disadvantage that the cathode ray tube can be destroyed.

Therefore, in order to demonstrate the light-emission capability of the cathode ray tubes 1R, 1G and 1B as much as possible while safety is maintained, it may be considered that each cathode current is detected so as to thereby detect the beam current and the luminance level is limited as a function of the detected current.

FIG. 3 is a diagram showing the principle. In FIG. 3, reference numeral 4 designates a terminal to which a color video signal SV is supplied. The video signal SV applied to the terminal 4 is supplied to a signal processing circuit 5 which then produces at its output terminals red, green and blue primary color signals R, G and B, respectively. The respective primary color signals R, G and B are supplied through drive circuits 3R, 3G and 3B to the cathodes of the cathode ray tubes 1R, 1G and 1B. A high voltage HV from a flyback transformer 6 is supplied to each anode of the cathode ray tubes 1R, 1G and 1B. Current detecting circuits 7R, 7G and 7B are, respectively, connected to the cathodes of the cathode ray tubes 1R, 1G and 1B. Detected signals SR, SG and SB of the cathode currents that are produced by detecting circuits 7R, 7G and 7B are, respectively, supplied through diodes 8R, 8G and 8B to one input terminal of a comparator 9. In other words, the maximum one of the detected signals SR, SG and SB is supplied thereto. Comparator 9 is supplied at its other input terminal with a reference level signal $V_{REF}$. A comparison error signal SC is supplied from comparator 9 to the signal processing circuit 5, in which on the basis of the comparison error signal SC, the luminance level, namely, the levels of the primary color signals R, G and B are limited so as to limit the beam current. In this example, let it be considered that a beam current of only 1 mA is supplied to the respective cathode ray tubes 1R, 1G and 1B. In this case, if the luminance level, and, the beam current is limited by the detected current of 1 mA, in the case of the white, red, green and blue color picture screens, the currents flowing through the respective cathode ray tubes 1R, 1G and 1B will be limited to levels as shown in the table of FIG. 4. Accordingly, cathode ray tubes will not be destroyed. Moreover, in the case of the white color picture screen, the light-emission luminance of each of the cathode ray tubes 1R, 1G and 1B becomes twice that of the example shown in FIG. 1. As mentioned above, if the circuit arrangement is as shown in FIG. 3, it is possible to make each of the cathode ray tubes 1R, 1G and 1B demonstrate its light-emission capability to the maximum while safety is maintained.

However, in a television receiver in which the beam current is detected by detecting the cathode current, due to parasitic capacity (for example, 8 pF to 15 pF) which is produced around the cathode, the leads and the like, a charging current that charges the parasitic capacity is included in the cathode current so that the detected current exceeds the beam current. As a result, it is impossible to detect the beam current correctly and hence there is a disadvantage that the correct ABL operation can not be accomplished. More particularly, in FIG. 5, if reference numeral 10 is the parasitic capacity, the parasitic capacity 10 is charged with a current Ic and the cathode detected current is obtained by adding the current Ic to a beam current Ib. In FIG. 5, reference numeral 1 designates a cathode ray tube, 3 a drive circuit and 7 a current detecting circuit.

Further, while in the above three-tube type video projector, the peak values of the red, green and blue primary color signals R, G and B that are respectively supplied to the cathode ray tubes 1R, 1G and 1B are detected and on the basis of the detected peak values the ABL control is carried out. When the set value for the ABL is made constant, if the characteristic of the cathode ray tubes 1R, 1G and 1B such as mutual conductance, cutoff frequency, gamma correction and so on are scattered, the beam current which will be limited is scattered so that accurate ABL control can not be obtained.

OBJECTS AND SUMMARY OF THE INVENTION

Accordingly, it is an object of this invention to provide an improved television receiver.

It is another object of this invention to provide a multi-tube type television receiver capable of accurately detecting beam current without being affected by parasitic capacity.

It is a further object of this invention to provide a multi-tube type television receiver in which maintains safety of each cathode ray tube, and in which an average value ABL control can be carried out so as to make the light-emission capability of each cathode ray tube as high as possible and a peak value ABL control can be accurately provided.

In one aspect of the present invention, a current source circuit is provided for the cathode current of a cathode ray tube, a current sink circuit is connected to ground terminal of the tube current which is supplied from the current source circuit is subtracted from the current in the current sink circuit, and the detected difference current therebetween is used as the beam current and the ABL control is carried out on the basis of the average value and the peak value of the detected current. The current in the current sink circuit is the beam current and the charging current for the parasitic capacity and the current that is supplied from the current source circuit is the charging current for the parasitic capacitance and the difference current therebetween is the beam current, so that it is possible to accurately detect the beam current. Further, since the average value ABL control is carried out on the basis of the detected beam current of each cathode ray tube, it is possible to make each cathode ray tube have maximum light-emission capability and the safety of each cathode ray tube is assured. Furthermore, since the peak value ABL control is carried out on the basis of the beam current that is detected by detecting the cathode current of each cathode ray tube, it is possible to carry out accurate peak value ABL control without affecting the scattering of the characteristics of the cathode ray tube.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is a diagram showing a prior art three-tube type video projector in which an average ABL (automatic brightness limiting) circuit is provided;

FIGS. 2A and 2B are respectively tables useful for explaining the prior art average value ABL control operation;

FIG. 3 is a diagram useful for explaining a prior art peak value ABL control operation for a three-tube type cathode ray tube;

FIGS. 4 and 5 are respectively a diagram and a table useful for explaining a prior art beam current detecting circuit;

DESCRIPTION OF THE PREFERRED EMBODIMENT

Now, the present invention will hereinafter be described with reference to the drawings.

Figure 6A:
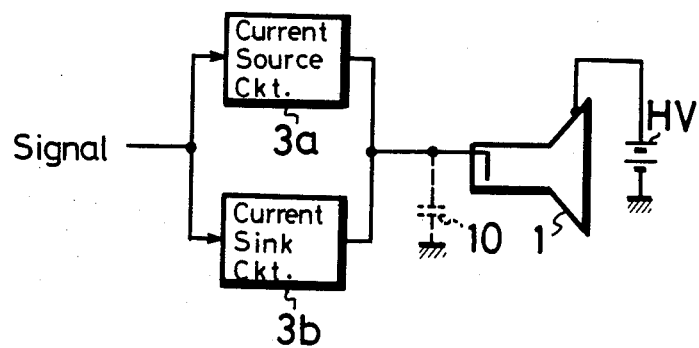
FIGS. 6A to 6C are respectively diagrams used to explain the principle of the beam current detecting circuit according to this invention.
Figure 6B:
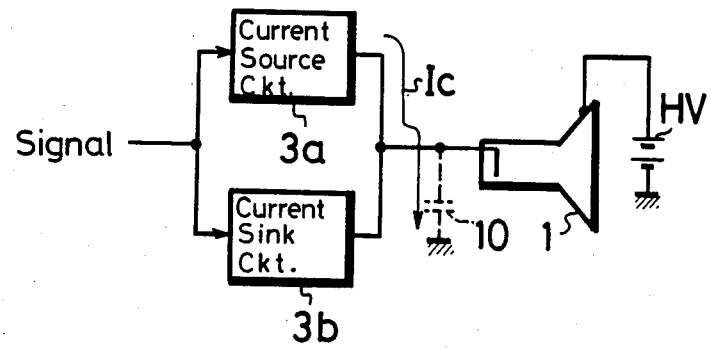
Figure 6C:
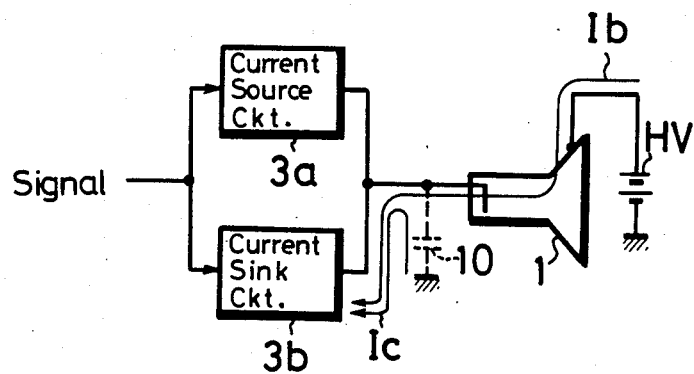

FIGS. 6A to 6C are, respectively, diagrams used to explain the theory of a beam current detecting circuit according to the present invention. In FIG. 6A, a drive circuit for driving a cathode of a cathode ray tube 1 is divided into two systems, in which one system is used as a current source circuit 3a that only supplies a current and the other is used as a current sink circuit 3b that only pulls or takes a current thereinto. When a high frequency signal is applied to the circuits 3a and 3b, charging and discharging occur a parasitic capacity 10. In such circuit construction, a charging current Ic to the parasitic capacitance 10 is supplied from the current source circuit 3a as shown in FIG. 6B. Further, in the current sink circuit 3b is a current that results from adding a current (which is the same as the charging current Ic) from the parasitic capacitance 10 to a beam current Ib as shown in FIG. 6C. Accordingly, in this invention, the beam current Ib is detected by subtracting the current Ic supplied by the current source circuit 3a from the current (Ib+Ic) that is detected in the current sink circuit 3b.

Figure 7:
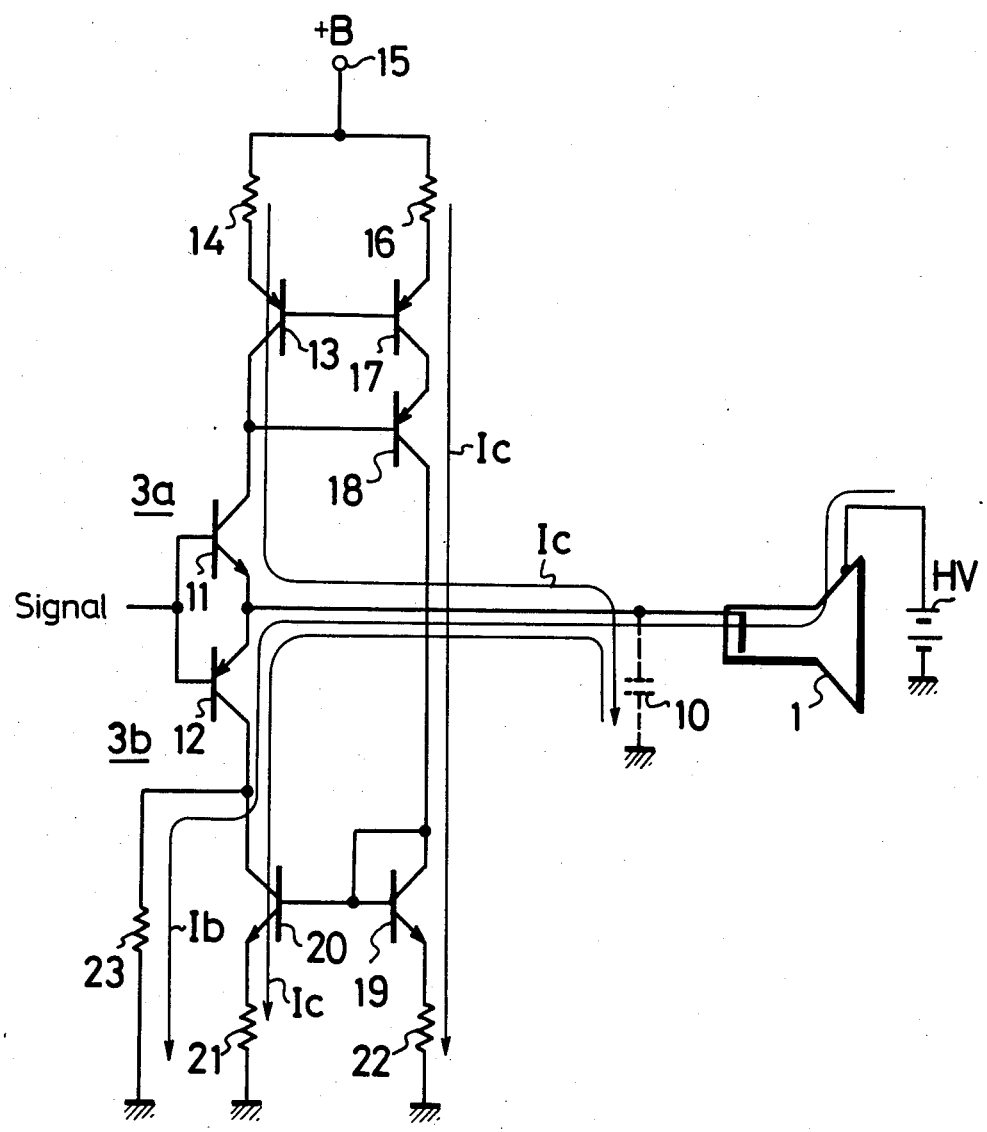
FIG. 7 is a circuit diagram showing an embodiment of the beam current detecting circuit according to this invention.

FIG. 7 schematically illustrates an embodiment of the television receiver according to this invention. In FIG. 7, like parts corresponding to those of FIG. 6 are marked with the same references and will not be described in detail.

In FIG. 7, reference numeral 11 designates an npn-type transistor that forms the current source circuit 3a and reference numeral 12 designates a pnp-type transistor that forms the current sink circuit 3b. The transistors 11 and 12 are complementary connected to each other. A signal is commonly supplied to the bases of the transistors 11 and 12. The connection point of the emitters thereof is connected to the cathode of the cathode ray tube 1.

The collector of the transistor 11 is connected through a collector-emitter path of a pnp-type transistor 13 and a resistor 14 to a power supply of voltage source terminal 15 to which a positive DC voltage +B is applied. The voltage source terminal 15 is connected through a resistor 16, an emitter-collector path of a pnp-type transistor 17 and an emitter-collector path of a pnp-type transistor 18 to a collector of an npn-type transistor 19. The bases of the transistors 13 and 17 are connected together and the base of the transistor 18 is connected to the collector of the transistor 13. In this case, the transistors 13, 17 and 18 constitute a current mirror circuit so that an equal current flows through the transistors 13, 17 and 18.

The collector of the transistor 12 is grounded through a collector-emitter path of an npn-type transistor 20 and a resistor 21. The emitter of the transistor 19 is grounded through a resistor 22. The base of the transistor 19 is connected to its collector to form a diode. The bases of the transistors 19 and 20 are connected together. In this case, the transistors 19 and 20 constitute a current mirror circuit, so that equal current flows through the transistors 19 and 20.

The collector of the transistor 12 is grounded through a beam current detecting resistor 23.

The circuitry of this embodiment which is constructed as described above operates as follows.

The current Ic that charges the parasitic capacitance 10 flows from the transistor 11 but this current Ic flows practically from transistor 13. Since the transistors 13, 17 and 18 constitute a current mirror circuit, the current Ic flows through the transistors 13, 17 and 18. This current Ic also flows into the transistor 19. Further, since the transistors 19 and 20 constitute a current mirror circuit, the current Ic also flows into the transistor 20. On the other hand, supplied to the transistor 12 is the current (Ib+Ic) that results from adding the current Ic from the parasitic capacitance 10 to the beam current Ib. Then, of the current (Ib+Ic), only the current Ic flows through the transistor 20 so that only the beam current Ib flows through the resistor 23. Accordingly, only the beam current Ib will be detected by detecting the voltage across the resistor 23.

As mentioned above, according to this embodiment, without being affected by the parasitic capacitance 10, it is possible to accurately detect the beam current Ib.

An embodiment of the circuit for carrying out an ABL control operation on the basis of both an average value and a peak value of the detected beam current according to this invention will be described in detail with reference to FIG. 8. In this embodiment, the present invention is applied to a three-tube type video projector.

Figure 8:
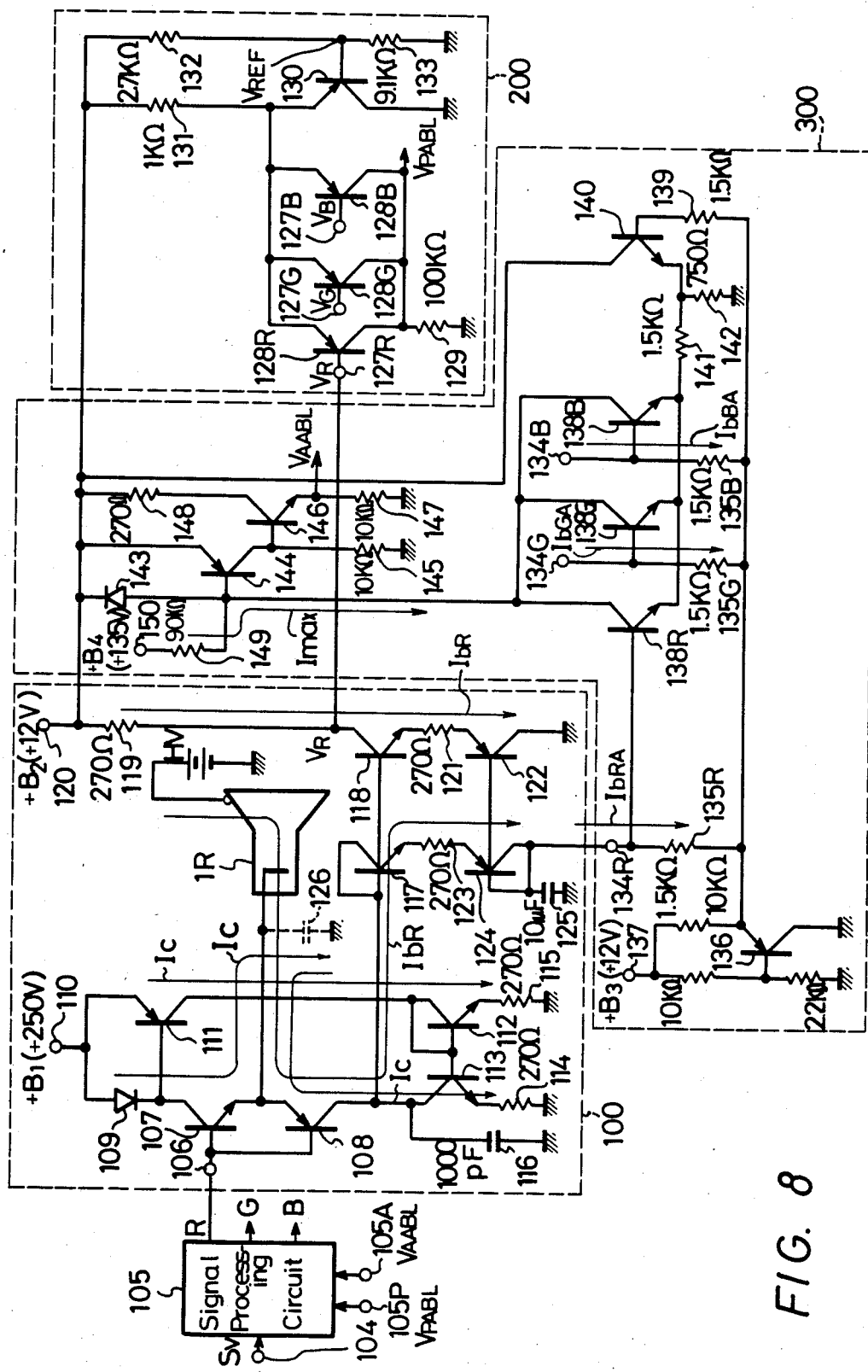
FIG. 8 is a circuit diagram showing an embodiment of the ABL control circuit according to this invention.

In FIG. 8, reference numeral 104 designates a terminal to which the color video signal SV is supplied, similar to FIG. 3. The video signal $S_v$ is supplied to a signal processing circuit 105 which then produces at its output side the red, green and blue primary color signals R, G and B. The red, green and blue primary color signals R, G and B are, respectively, supplied through drive circuits to the red, green and blue color cathode ray tubes 1R, 1G and 1B. Further, each of the beam currents is detected the cathode current of the cathode ray tubes 1R, 1G and 1B.

The cathode ray tubes 1G and 1B have portions which are formed similarly to the portion 100 of the cathode ray tube 1R and hence they are not shown in detail FIG. 8.

The red primary color signal R is supplied through a terminal 106 to an npn-type transistor 107 and to a pnp-type transistor 108 which constitute the drive circuit. Then, the signal obtained at the connection point between the emitters thereof is supplied to the cathode of the cathode ray tube 1R, whereby the cathode ray tube 1R is driven.

The collector of the transistor 107 is connected through an anode-cathode path of a diode 109 to a power supply or voltage source terminal 110 to which a positive DC voltage +B (for example+250 V) is applied. The voltage source terminal 110 is connected through an emitter-collector path of a pnp-type transistor 111 to a collector of an npn-type transistor 112. Further, the base of the transistor 111 is connected to the cathode of the diode 109. In this case, the transistor 111 and the diode 109 constitute a current mirror circuit so that an equal current flows through the transistor 111 and the diode 109.

The collector of the transistor 108 is grounded through the collector-emitter path of an npn-type transistor 113 and a resistor 114. The emitter of the transistor 112 is grounded through a resistor 115. The base of the transistor 112 is connected to its collector to form a diode. The bases of the transistors 112 and 113 are coupled together. In this case, the transistors 112 and 113 constitute a current mirror circuit, whereby an equal current flows through the transistors 112 and 113.

The collector of the transistor 108 is grounded through a capacitor 116. The collector of the transistor 108 is also connected to the bases of transistors 117 and 118. The collector of the transistor 117 is connected to its base to form a diode. In this case, the transistors 117 and 118 constitute a current mirror circuit, so that an equal current will flow through the transistors 117 and 118.

The collector of the transistor 118 is connected through a resistor 119 to a power supply or voltage source terminal 120 to which a positive DC voltage +B$_2$ (for example +12 V) is applied. The emitter of the transistor 118 is grounded through a resistor 121 and the emitter-collector path of a pnp-type transistor 122. The emitter of the transistor 117 is connected through a resistor 123 to an emitter of a pnp-type transistor 124. The collector of this transistor 124 is connected to its base to form a diode. The base of the transistor 124 is grounded through a capacitor 125. In this case, the transistors 122 and 124 constitute a current mirror circuit, so that an equal current will flow through the transistors 122 and 124.

In the circuit arrangement constructed as above, a parasitic capacitance 126 exists in the cathode of the cathode ray tube 1R and the current Ic that charges this parasitic capacitance 126 flows from the diode 109. In this case, as explained in connection with FIG. 7, only a beam current $I_{bR}$ flows through the transistor 117.

Since the transistors 117 and 118 constitute a current mirror circuit, the beam current $I_{bR}$ also flows through the transistor 118 and this beam current $I_{bR}$ also flows into the transistor 122. Further, since the transistors 122 and 124 constitute a current mirror circuit, the beam current $I_{bR}$ also flows through the transistor 124.

As described above, since the beam current $I_{bR}$ flows through the transistor 118 and produces at the collector of the transistor 118 a voltage $V_R$ expressed as $V_R = +B - I_{bR} \times R_{119}$ (R$_{119}$ represents the resistance value of the resistor 119).

This voltage $V_R$ is applied through a terminal 127R to the base of a pnp-type transistor 128R that is a part of a peak value ABL circuit 200. Voltages $V_G$ and $V_B$, which are produced similarly, corresponding to beam currents $I_{bG}$ and $I_{bB}$ of the green and blue cathode ray tubes 1G and 1B are respectively, applied through terminals 127G and 127B to the bases of pnp-type transistors 128G and 128B in the peak value ABL circuit 200. The collectors of the transistors 128R, 128G and 128B are connected together and the connection point is grounded through a resistor 129. The emitters of the transistors 128R, 128G and 128B are connected together and to an emitter of a pnp-type transistor 130 in the peak value ABL circuit 200 and the connection point therebetween is connected through a resistor 131 to the voltage source terminal 120. The collector of this transistor 130 is grounded. The voltage source terminal 120 is grounded through a series circuit of resistors 132 and 133 and a voltage $V_{REF}$ produced at the connection point between the resistors 132 and 133 is applied to the base of the transistor 130 as its bias voltage. In this case, the voltage $V_{REF}$ is set as follows:

$$V_{REF} = +B_3 - R_{119} \times \text{critical beam current}$$

With such circuit construction, if one of the beam currents $I_{bR}$, $I_{bG}$ and $I_{bB}$ becomes the critical beam current, one of the transistors 127R, 127G and 127B is turned on and a predetermined voltage $V_{PABL}$ is produced at the connection point of the collectors of the transistors 127R, 127G and 127B. This voltage $V_{PABL}$ is applied to a peak value ABL control terminal 105P of the signal processing circuit 105 whereby the peak value ABL is applied. That is, the brightness or luminance level is limited and hence the beam currents $I_{bR}$, $I_{bG}$ and $I_{bB}$ are limited so as not to exceed the critical beam current.

The current $I_{bR}$ that flows through the transistor 124 as mentioned above is integrated by the capacitor 125 and becomes an average current $I_{bRA}$. Thereafter, this average current $I_{bRA}$ is supplied through a terminal 134R and a resistor 135R to an emitter of a pnp-type transistor 136 in an average value ABL circuit 300. Though not shown, similarly produced average currents $I_{bGA}$ and $I_{bBA}$ corresponding to the beam currents $I_{bG}$ and $I_{bB}$ of the green and blue cathode ray tubes 1G and 1B are respectively supplied through terminals 134G and 134B and also through resistors 135G and 135B to the emitter of the transistor 136 in the average value ABL circuit 300. In this case, the resistors 135R, 135G and 135B are selected to have the same resistance values. The transistor 136 is used to set the bias voltage. Reference numeral 137 designates a power supply or voltage source terminal to which a positive DC voltage $+B_3$ (for example $+12$ V) is applied. The voltage produced at the emitter of the transistor 136 is applied through the resistors 135R, 135G and 135B to bases of npn-type transistors 138R, 138G and 138B that are components of the average value ABL circuit 300 as its bias voltage and also through a resistor 139 to a base of an npn-type transistor 140 as its bias voltage in the average value ABL circuit 300.

The emitters of the transistors 138R, 138G and 138B are connected together and the connection point thereof is grounded through resistors 141 and 142. Further, the collectors thereof are coupled together and the connection point is connected through an anode-cathode path of a diode 143 in the average value ABL circuit 300 to the voltage source terminal 120. The emitter of the transistor 140 is connected to the connection point between the resistors 141 and 142 and the collector thereof is connected to the voltage source terminal 120. The anode of the diode 143 is connected to a base of a pnp-type transistor 144 in the ABL circuit 300. The collector of this transistor 144 is grounded through a resistor 145 and the emitter thereof is connected to the voltage source terminal 120. The collector of this transistor 144 is connected to a base of an npn-type transistor 146. The emitter of the transistor 146 is grounded through a resistor 147 and the collector thereof is connected through a resistor 148 to the voltage source terminal 120. The base of the transistor 144 is connected through a resistor 149 to a power supply or voltage source terminal 150 to which a positive DC voltage $+B_4$ (for example, 30 135 V) is applied. In this case, the resistance value $R_{149}$ of the resistor 149 is set at a value that is determined as follows. When any one of the beam currents $I_{bRA}$, $I_{bGA}$ and $I_{bBA}$ becomes the predetermined set current, the voltage drop $I_{max} \times R_{149}$ caused by a current $I_{max}$ that will be described later and which flows through the resistor 149 satisfies the following equation as given by $$+B_4 - I_{max} \times R_{149} = +B_2 - V_{BE} \tag{1}$$

and the transistor 144 is turned on, and $V_{BE}$ represents a base-emitter voltage of the transistor.

Usually, since a current flows from the voltage source terminal 150 and through the resistor 149 and the diode 143 to the voltage source terminal 120, the transistor 144 is turned off.

In this circuit arrangement, voltages $I_{bRA} \times R_{135R}$, $I_{bGA} \times R_{135G}$ and $I_{bBA} \times R_{135B}$ ($R_{135R}$, $R_{135G}$ and $R_{135B}$ respectively, represent resistance values of the resistors 135R, 135G and 135B) are respectively produced across the resistors 135R, 135G and 135B. Thus, there is a tendency that the currents $I_R$, $I_G$ and $I_B$ corresponding to the beam currents $I_{bRA}$, $I_{bGA}$ and $I_{bBA}$ respectively flows through the transistors 138R, 138G and 138B. For example, when the resistance values of the respective resistors are as marked in FIG. 8, the currents $I_R$, $I_G$ and $I_B$ become equal to the currents $I_{bRA}$, $I_{bGA}$ and $I_{bBA}$, respectively. Now, let us consider the transistor 138R. Then, if the emitter voltage 2[V] of the transistor 140 is taken as a reference, a voltage of 1.5 $[k\Omega] \times I_R$ [mA]+2[V] is produced at the emitter of the transistor 138R. While, a voltage of $2[V]+V_{BE}[V]+1.5$ $[\Omega] \times I_{bRA}$[mA] is produced at the base of the transistor 138R and the following equation is established;

$$1.5[k\Omega] \times I_R[mA]+2[V]+V_{BE}[V]=2[V]+V_{BE}[V]+1.5\ [k\Omega] \times I_{bRA}[mA]$$

Thus $$I_R = I_{bRA} \tag{2}$$

is established.

As described above, although the currents $I_R$, $I_G$ and $I_B$ corresponding to the currents $I_{bRA}$, $I_{bGA}$ and $I_{bBA}$ tend to flow through the transistors 138R, 138G and 138B, only one transistor of the transistors 138R, 138G and 138B that corresponds to the maximum current $I_{max}$ of the currents $I_{bRA}$, $I_{bGA}$ and $I_{bBA}$ is turned on. Accordingly, of the currents $I_R$, $I_G$ and $I_B$, only the maximum current $I_{max}$ flows through the transistor. This current $I_{max}$ is supplied to the transistor from the voltage source terminal 150 through the resistor 149.

When any one of the currents $I_{bRA}$, $I_{bGA}$ and $I_{bBA}$ becomes the set current, the current $I_{max}$ satisfies the above equation (1) so that at this time the transistor 144 is turned on. As a result, the transistor 146 is turned on to produce at its emitter the predetermined voltage $V_{AABL}$. Then, this voltage $V_{AABL}$ is applied to the average value ABL control terminal 105A of the signal processing circuit 105 and thereby the average value ABL control is applied. In other words, the luminance lever is limited and hence the average values $I_{bRA}$, $I_{bGA}$ and $I_{bBA}$ of the beam currents $I_{bR}$, $I_{bG}$ and $I_{bB}$ are controlled so as not to exceed the set values.

Figure 8A:
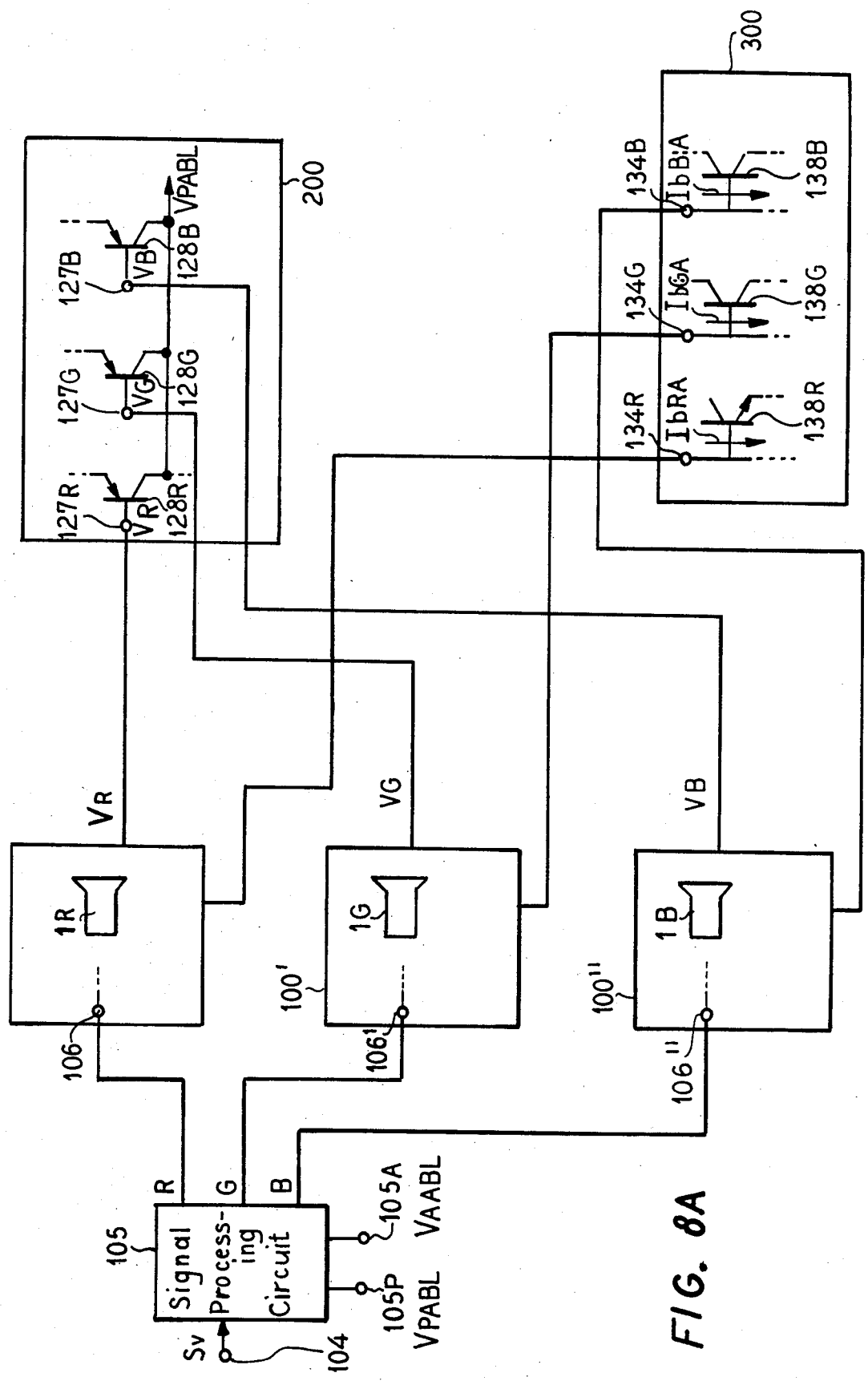
FIG. 8A illustrates the circuits for the green and blue cathode ray tubes.

FIG. 8A illustrates the processing circuits for the green and blue cathode ray tubes. The signal processing circuit 105 provides a G output to a signal processing circuit 100' for the green cathode ray tube which produces an output VG which is connected to terminal 127G in the peak value circuit 200 and also produces an output which is applied to terminal 134G in the average value ABL circuit 300. A blue cathode ray tube processing circuit 100" also receives an input from the B output terminal of the signal processing circuit 105 and produces an output $V_B$ which is supplied to terminal 127B in the peak value circuit 200 and produces an output at which is supplied to terminal 134B in the average value ABL circuit 300. It is to be realized as stated in the specification that and identical components for the green and blue circuits in circuits 100' and 100" to those that are in circuit 100 illustrated in detail in FIG. 8.

As described above, according to this embodiment, since the respective beam currents $I_{bR}$, $I_{bG}$ and $I_{bB}$ of the respective cathode ray tubes 1R, 1G and 1B are detected by detecting their cathode currents and the average ABL control is carried out on the basis of the average values $I_{bRA}$, $I_{bGA}$ and $I_{bBA}$, it is possible to demonstrate the light-emission capability of each cathode ray tube as much as possible while the safety is maintained. The luminance level, namely, the average beam current is limited by the detected current, 1 mA. In the case of the white, red, green and blue color picture screens, the currents flowing through the cathode ray tubes are limited by the level as shown in the table of FIG. 4. Accordingly, while the cathode ray tubes can be prevented from being destroyed and so on, in the case of, for example, the white picture, the brightness thereof becomes 2.2 times the brightness of the example shown in FIG. 1.

Further, since the beam currents $I_{bR}$, $I_{bG}$ and $I_{bB}$ are detected by detecting the cathode currents and the peak value ABL control is carried out on the basis of the detected beam currents, it is possible to carry out the accurate peak value ABL control without affecting the scattered characteristics of the cathode ray tubes 1R, 1G and 1B.

While the values of the circuit element in the above embodiment (shown in FIG. 8) are examples, the above values are not limited to such examples.

While the above embodiment is concerned with the three-tube type video projector, this invention can be applied to other multi-tube type television receivers.

As is clear from the above-described embodiment, according to this invention, since the current (the charging current to the parasitic capacitance) that is supplied from the current source circuit is subtracted from the current (the sum of the beam current and the charging current to the parasitic capacitance) that is taken into the current sink circuit and the resultant difference current (beam current) is detected as the beam current, it is possible to detect accurately the beam current without it being affected by the parasitic capacitance. Therefore, when the beam current detecting circuit according to this invention is employed, the ABL circuit can be operated correctly.

Further, since the parasitic capacitance is not considered as a fixed value, it is possible to cope with the variations of the capacitance which is caused by different wiring materials and layout of the parts.

Furthermore, according to the present invention, since the average value ABL control operation is carried out while observing the detected beam current of each cathode ray tube, it is possible to make the light-emission capability of each cathode ray tube be as great as possible with the safety of each cathode ray tube being maintained.

In addition, since the peak value ABL control is carried out on the basis of the beam current that is detected by detecting the cathode current of each cathode ray tube, it is possible to carry out the accurate peak value ABL control without it being affected by the variations of the characteristic of each cathode ray tube.

The above description is given for a single preferred embodiment of the invention, but it will be apparent that many modifications and variations could be effected by one skilled in the art without departing from the spirit or scope of the novel concepts of the invention, so that the scope of the invention should be determined only by the appended claims.

We claim as our invention:

1. In a television receiver a circuit for controlling the luminance level comprising: a plurality of cathode ray tubes; a plurality of beam current detection circuits each corresponding to one of said plurality of cathode ray tubes, each having a current source circuit connected to a cathode of each of said cathode ray tubes, each having a current sink circuit connected to the cathode of each of said cathode ray tubes, and each having a circuit for subtracting the current of said current source circuit from the current of said current sink circuit; and a signal processing circuit for controlling the luminance level of each of said cathode ray tubes in accordance with the peak values and the average values of the outputs of said detection circuits.

2. In a television receiver a circuit for controlling the luminance value according to claim 1, wherein said control circuits includes a current mirror circuit.

3. In a television receiver a circuit for controlling the luminance value according to claim 1, wherein each of said control circuits includes a comparator for comparing a voltage drop due to peak values of said beam currents with a standard voltage.

4. In a television receiver a circuit for controlling the luminance value according to claim 1, wherein each of said control circuits includes a comparator for comparing a voltage drop due to average values of said beam currents with a standard voltage.

5. In a television receiver a circuit for controlling the luminance value according to claim 3, wherein said control circuit includes a signal processing circuit supplied with an output signal of said comparator.

6. In a television receiver according to claim 4, a circuit for controlling the luminance value, wherein said control circuit includes a signal processing circuit supplied with an output signal of said comparator.

* * * * *